(12) United States Patent
Lelievre et al.

(10) Patent No.: US 9,290,070 B2
(45) Date of Patent: Mar. 22, 2016

(54) WHEEL RIM EQUIPPED WITH AN INFLATION VALVE AND METHOD OF INSTALLATION OF SUCH A VALVE

(71) Applicants: Gwenn Lelievre, Toulouse (FR);
Frederic Gaugain, Leguevin (FR);
Pascal Petitjean, Saint-Thomas (FR)

(72) Inventors: Gwenn Lelievre, Toulouse (FR);
Frederic Gaugain, Leguevin (FR);
Pascal Petitjean, Saint-Thomas (FR)

(73) Assignees: CONTINENTAL AUTOMOTIVE FRANCE, Toulouse (FR);
CONTINENTAL AUTOMOTIVE GMBH, Hannover (DE)

(*) Notice: Subject to any disclaimer, the term of this patent is extended or adjusted under 35 U.S.C. 154(b) by 21 days.

(21) Appl. No.: 14/476,988

(22) Filed: Sep. 4, 2014

(65) Prior Publication Data
US 2015/0059948 A1    Mar. 5, 2015

Related U.S. Application Data

(60) Provisional application No. 61/873,985, filed on Sep. 5, 2013.

(51) Int. Cl.
*B60C 29/02* (2006.01)
*B60C 29/00* (2006.01)

(52) U.S. Cl.
CPC ............ *B60C 29/005* (2013.01); *B60C 29/02* (2013.01); *Y10T 137/0491* (2015.04); *Y10T 137/374* (2015.04)

(58) Field of Classification Search
CPC ...... B60C 29/005; B60C 29/02; B60C 29/066
USPC .................................. 152/427–428
See application file for complete search history.

(56) References Cited

U.S. PATENT DOCUMENTS

| 4,049,037 A * | 9/1977 | Gale ..................... B60C 29/02 |
| | | 152/427 |
| 6,845,969 B2 * | 1/2005 | Kayukawa ............. B60C 29/02 |
| | | 137/234.5 |

* cited by examiner

*Primary Examiner* — John Walters
*Assistant Examiner* — James Triggs
(74) *Attorney, Agent, or Firm* — Young & Thompson

(57) ABSTRACT

A wheel rim is equipped with an inflation valve (10) that is capable of elastic deformation adapted to be positioned in an opening (30) in the wheel rim (31) of a wheel of a motor vehicle. The valve (10) exhibits a valve body (12) made from an elastically deformable material surrounding a valve core (11) adapted to form an air passageway (15). The valve body (12) is provided with a sealing groove (21) adapted to receive the wheel rim, and with an intermediate part (22) having a diameter greater than the opening in the wheel rim. The inflation valve (10) is provided in addition with an element for the distribution (40) of shear forces pre-installed on the valve body (12). A method of installation of the inflation valve is also described.

10 Claims, 4 Drawing Sheets

WHEEL RIM EQUIPPED WITH AN INFLATION VALVE AND METHOD OF INSTALLATION OF SUCH A VALVE

FIELD OF THE INVENTION

The present invention relates to a motor vehicle wheel rim equipped with an inflation valve and a method of installation of such a valve. More specifically, it relates to a wheel rim equipped with an inflation valve that is capable of elastic deformation (inflation valve referred to as "snap-in" type in English language) adapted to be positioned in an opening in the wheel rim. This valve may be associated with an electronic tire pressure monitoring module. The invention also relates to an inflation valve and a method of installation of an inflation valve on a wheel rim.

BACKGROUND OF THE INVENTION

It is, in fact, already well known to monitor pressure that is present in the interior of the tires of a motor vehicle. For this purpose, the monitoring systems known to date include, for example:
at the level of at least one wheel of the vehicle, a wheel module including an electronic module associated with an inflation valve of the tire and,
at the level of the passenger compartment of the vehicle, an electronic control unit.

Each electronic module includes in particular pressure sensors and temperature sensors, but may also include other sensors, for example acceleration sensors, shock sensors, etc., associated with a control unit equipped with at least one RF (Radio Frequency) transmitter and one LF (Low Frequency in the English language, for "Basses Fréquences") receiver. Each electronic module also includes, in a manner known per se, storage means and a battery (for example a button cell).

The inflation valve associated with this electronic module is conventionally of two types. Either it is a metal inflation valve screwed into an opening in a wheel rim of the vehicle, or it is a "snap-in" valve (capable of elastic deformation) intended for insertion by force into the opening in the wheel rim by deformation of the elastic material forming its body. The present invention relates more specifically to a system for monitoring the pressure of the tires including an inflation valve known as a "snap-in" valve (capable of elastic deformation) associated with an electronic module for monitoring the pressure of the tires.

Such elastically deformable inflation valves exhibit the particularity of including a sealing groove, into which a wheel rim will be inserted when the valve is positioned on the wheel rim of the vehicle. In cross section, this sealing groove largely exhibits the form of a U and receives the wheel rim (steel/aluminum . . . ) in the interior of the two branches of the U. The part of the wheel rim that is received in the sealing groove is more or less thick according to the vehicle models and the choice of the wheel rim dimension. In a known manner, the majority of current wheel rims measure from 1.5 mm to 5 mm in thickness. For reasons of material costs, the most common thickness is in the order of 2 mm.

For reasons of reducing the cost of raw materials, but also in order to make the wheel rim lighter and to improve the performance of the vehicle with regard to fuel consumption, automobile designers would like to use increasingly thin wheel rims (thickness less than or equal to 1.5 mm). This reduction in the thickness of the wheel rim is possible only by optimizing the material utilized to produce this wheel rim, in particular by providing it with appropriate rigidity. However, by greatly reducing the thickness of the wheel rim, it behaves increasingly like a blade of a knife in continuous clamping contact with the elastic material of the sealing groove provided in the body of the inflation valve that is capable of elastic deformation (snap-in). This results in risks of shear ruptures (cutting) of the elastic material at the bottom of the sealing groove, leading in the long term to air leakage and a lack of sealing of the inflation valve. This should be avoided, of course.

The inflation valves that are capable of elastic deformation known to date thus exhibit substantially reduced service lives when they are used with wheel rims of small thicknesses (thickness less than 1.5 mm).

SUMMARY OF THE INVENTION

The object of the present invention is to overcome the disadvantages mentioned above by creating an inflation valve capable of elastic deformation that is capable of being installed on wheel rims having a thickness of less than 1.5 mm without any reduction in the service life of such valves and without any loss of sealing. The invention also has as its object the creation of a wheel rim of small thickness ($\leq 1.5$ mm) intended to be inserted into a sealing groove of an inflation valve that is capable of elastic deformation without any reduction in the service life of the inflation valve and without any loss of sealing.

For this purpose, the present invention relates to a wheel rim of a motor vehicle equipped with an inflation valve of a type that is capable of elastic deformation adapted to be positioned in an opening in the wheel rim. The inflation valve exhibits:
a valve body made from an elastically deformable material surrounding a valve core adapted to form an air passageway. The valve body is provided with a sealing groove adapted to receive the wheel rim.
an external extremity provided with a sealing cap for closing the air passageway in a detachable manner,
an internal extremity forming a valve head having a diameter greater than the opening in the wheel rim,
an intermediate part having a diameter greater than the opening in the wheel rim and smaller than the valve head situated between the external extremity of the inflation valve and the sealing groove.

According to the invention, a means for the distribution of shear forces is arranged between the wheel rim and the valve.

According to a first embodiment, the interposition of a means for the distribution of shear forces between the wheel rim and the valve thus makes it possible to reduce the shear forces and the accumulation of stresses located at the level of the sealing groove in which the wheel rim is accommodated. According to this first embodiment, the means of distribution is a separate element associated with the wheel rim and with the inflation valve, although it does not constitute an integral part either of the valve or of the wheel rim.

The means for the distribution of the shear forces assures an increased service life of the inflation valve, even if the wall of the wheel rim has a thickness of less than or equal to 1.5 mm. When the thickness of the wheel rim is greater than 1.5 mm, the service life of the valve is similarly increased. In fact, the introduction of this means for the distribution of the shear forces between the wheel rim and the edge of the sealing groove makes it possible to limit the "knife" effect of the wheel rim. Furthermore, this means of distribution limits the forces that are transmitted to the valve body in the course of its insertion into the opening in the wheel rim. This limits the risks of deterioration of the sealing groove at the moment of positioning the valve in the opening in the wheel rim. As a result, the structure of the sealing groove is less challenged by the introduction of the wheel rim, which enables it to tolerate wheel rims of small thicknesses more readily for its entire service life.

According to a second embodiment, the means of distribution is an integral part of the wheel rim and is constituted by an excess thickness provided in the immediate vicinity of the opening in the wheel rim that is intended to receive the inflation valve.

According to a third embodiment, the means of distribution is associated with the inflation valve. In a preferential manner, it is pre-installed on this inflation valve.

In a preferential manner, when the means of distribution is pre-installed on the inflation valve, it is positioned on the intermediate part of the valve by elastic clamping. More specifically the means of distribution is arranged in the immediate vicinity of the sealing groove. This pre-positioning in fact makes it possible significantly to reduce (distribute/standardize) the stresses (forces) attributable to the insertion of the valve into the opening in the wheel rim.

As a variant, the means of distribution may be pre-installed in the sealing groove prior to the insertion of the valve into the opening in the wheel rim.

Advantageously, the means for the distribution of the shear forces is a washer that is produced from a material having a hardness greater than that of the elastically deformable material of the valve body. By way of example, this material may be metal and/or plastic. When the means of distribution is an integral part of the wheel rim (for example when it is constituted by an excess thickness of the wheel rim at the level of the opening in the wheel rim), the material constituting this excess thickness also exhibits a hardness at this point greater than the elastically deformable material constituting the body of the valve.

The present invention also relates to a method of installation of an inflation valve of the kind previously described on a wheel rim of a motor vehicle.

The method of installation includes the following stages:
pre-positioning of a means for the distribution of the shear forces between the inflation valve and the wheel rim,
insertion of the inflation valve into the opening in the wheel rim, and
insertion of the means of distribution into the sealing groove between the wheel rim and the valve head.

In a preferential manner, the valve is pre-installed on the intermediate part of the valve body ahead of its insertion into the opening in the wheel rim. More specifically, the means of distribution is pre-installed in the vicinity of the sealing groove.

BRIEF DESCRIPTION OF THE DRAWINGS

Other objects, characterizing features and advantages of the present invention will be appreciated from the following description, provided by way of non-limiting example, with regard to the drawings annexed hereto, in which.

DETAILED DESCRIPTION OF THE INVENTION

Figure 1:
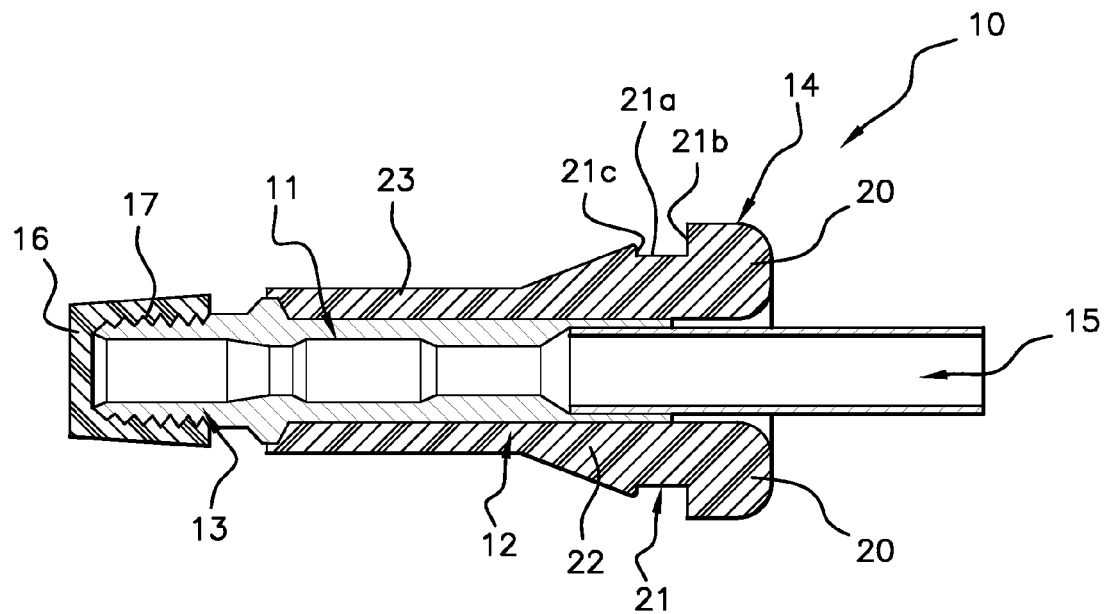
FIG. 1 is a schematic view in cross section of a valve that is capable of elastic deformation according to prior art.

The inflation valves 10 that are capable of elastic deformation of a known type usually consist (FIG. 1):
of a metal valve core 11,
of a valve body 12 made from an elastically deformable material at least partially covering the valve core 11.

The inflation valve formed in this way includes an external extremity 13 for receiving a cap 16 screwed onto a thread 17 for the purpose of blocking an air passageway 15 in a detachable manner, and an internal extremity 14 constituting a valve head 20. The air passageway 15 discharges at the level of the internal extremity 14 of the valve.

In a known manner, the valve body includes:
a valve head 20 (FIG. 3) situated at the level of the internal extremity 14 of the valve and exhibiting a diameter greater than that of an opening 30 in a wheel rim 31 intended to receive the inflation valve,
a sealing groove 21 (FIG. 1) exhibiting essentially a U-shaped form, that is to say, having a bottom 21a that is essentially flat flanked by two branches 21b and 21c (in the example represented in FIG. 1, the branches of this U are of different heights),
an intermediate part 22 of largely truncated form, and
a terminal part 23.

The valve body 12 thus includes from the external extremity 13 towards the internal extremity 14, a terminal part 23, a truncated intermediate part 22, a sealing groove 21 and a valve head 20.

Figure 2:
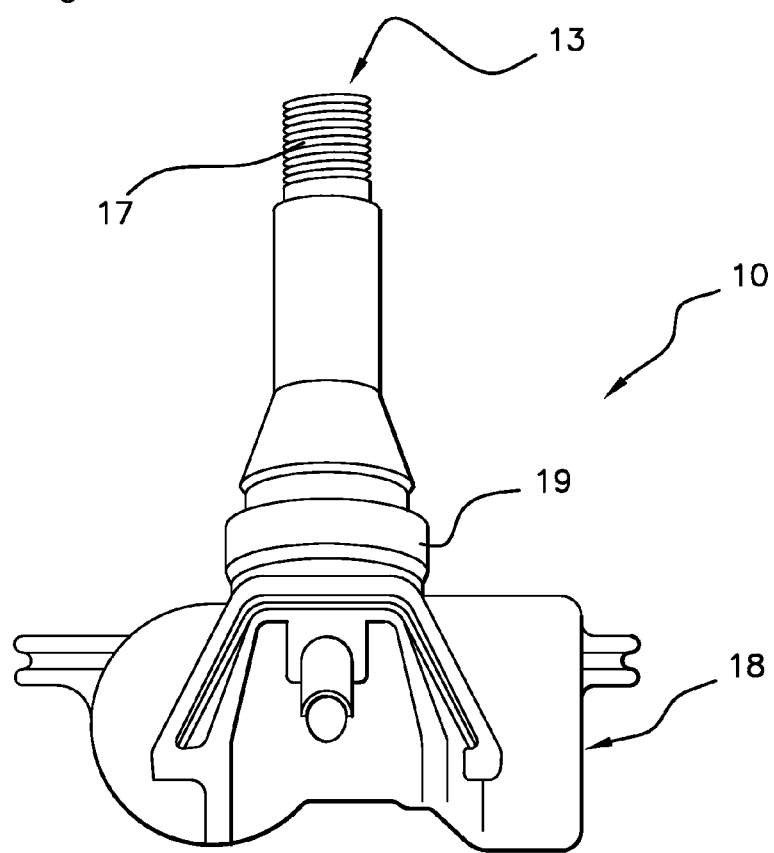
FIG. 2 is a schematic view in perspective of a wheel module including an inflation valve that is capable of elastic deformation and an electronic module according to prior art.

When the inflation valves, according to prior art, are part of a system for monitoring the pressure of the tires, they are adapted in addition to receive an electronic module 18 (FIG. 2) at the level of their internal extremity 14. This electronic module is secured by any appropriate means to the internal extremity 14 of the valve 10. In the depicted example, the electronic module 18 is associated with the inflation valve 10 by means of a sliding ring 19 in order to constitute a wheel module. This sliding ring is positioned on a coupling element 25 (FIG. 3) that is integral with the inflation valve. This is only one securing means among others, however, and a person skilled in the art will be able to utilize any other appropriate securing means without going beyond the ambit of the present invention.

Figure 3:
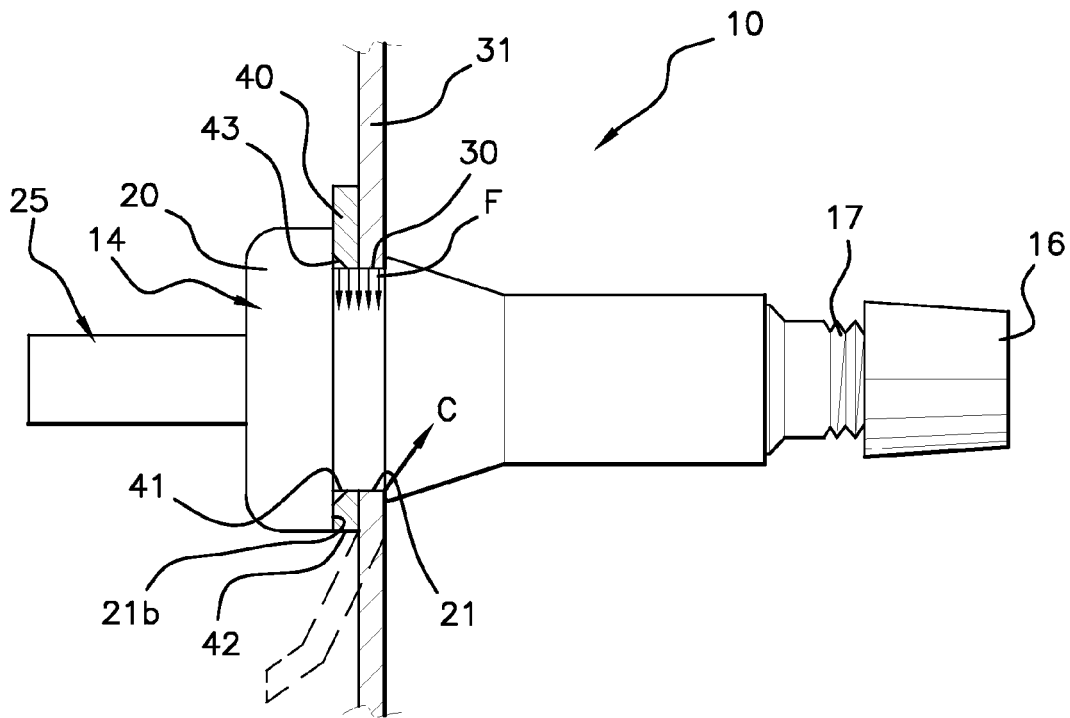
FIG. 3 is a schematic view, partially in perspective and partially in cross section, of a valve that is capable of elastic deformation, according to the invention, installed on a wheel rim of a vehicle, provided with a means for the distribution of shear forces.

The inflation valves that are capable of elastic deformation are adapted to be positioned in an opening 30 in a wheel rim 31 (see FIG. 3).

According to the invention and with reference to FIG. 3, the inflation valve is associated in addition with a means for the distribution 40 of the shear forces C (see FIG. 3; a single shear force is depicted here for the sake of clarity. However, these shear forces make their effect felt at the level of each point of contact between the wheel rim 31 and the sealing groove 21). Advantageously, this means of distribution 40 is constituted by a washer, of which the hardness is greater than the hardness of the material constituting the valve body 12. For example, this washer is constituted by a metal and/or plastic material.

Figure 5:
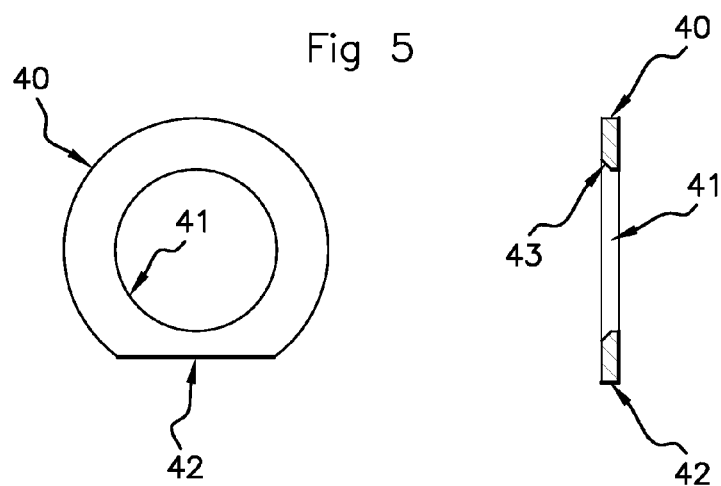
FIG. 5 is a schematic view from above and in cross section of a means of distribution according to the invention.

The means of distribution 40 includes an internal opening 41 (FIG. 5) having a diameter similar to that of the opening 30 produced in the wheel rim 31.

Advantageously, the means of distribution 40 is provided with a flat side 42 (FIG. 5) which allows it to be inserted into any wheel rim profile. The space occupied by it is, in fact, essentially the same as that of the valve head 20, in particular at the level of its lower part (in FIGS. 3 and 5), which permits a wheel rim having an inclined profile (indicated by dashed lines—in FIG. 3) to accommodate the means of distribution 40 unhindered.

It should be noted that those sealing grooves 21 that have been available until now are capable of receiving wheel rims of which the thickness ranges from 1.5 to 5 mm and are thus sufficiently wide to receive (without modification) wheel rims of low thickness (thickness less than or equal to 1.5 mm) and a means of distribution 40 according to the invention.

It should also be noted that, if the space available inside the sealing groove itself were to prove insufficient to accommodate the means of distribution 40 and the wheel rim 31, the elasticity of the material constituting the valve body 12 is still sufficient to bring about a necessary deformation to accommodate the wheel rim 31 and the means of distribution 40. This increased deformation of the material of the valve body in addition favors the sealing of the compressed zone. The means of distribution according to the invention may thus be utilized not only with the "new" wheel rims of low thickness, but may in addition also be utilized with the "old" wheel rims having greater thicknesses.

According to the invention, the means of distribution 40 is advantageously provided with a chamfer 43 facilitating its insertion onto the valve body 12. The form of this chamfer is adapted to facilitate and to reduce the forces involved in the insertion of the valve into the opening in the wheel rim. In particular, the openings in wheel rims are often produced in large numbers with tools leaving a very poor surface condition at the level of the opening in the wheel rim. It is possible, for example, for burrs to remain from drilling of the opening, which exhibit a tendency to cause the valve body to deteriorate when it is being stretched for the purpose of its introduction into the opening in the wheel rim. According to the invention, the chamfers provided on the washer make it possible to counter the poor condition of the surface of the opening in the wheel rim and facilitate stretching of the valve body without giving rise to deterioration therein. As a result, the presence of the chamfers provided on the washer for distributing the shear forces facilitate and limit the forces arising during insertion of the valve into the opening in the wheel rim.

According to the invention, the means of distribution 40 is in addition pre-positioned on the valve body, prior to the positioning of the valve 10 in the opening 30 in the wheel rim. This pre-positioning is advantageous in several respects:
  on the one hand, pre-positioning the means of distribution 40 on the valve body 12 helps to ensure that these two elements are incorporated ahead of the installation of the valve in the opening 30 in the wheel rim. The aim of such an incorporation is to make sure that these two elements are still joined together ahead of installation and to prevent one of them from being absent when it is wished to put the inflation valve in position.
  on the other hand, the pre-positioning of the means of distribution 40 on the valve body makes it possible to reduce the forces that will be necessary at the time of the insertion of the inflation valve into the opening in the wheel rim. Pre-positioning is carried out in the factory (at the time of manufacture of the inflation valve) with adapted tools and a positioning device, which minimizes the risks of deterioration of the elastic material of the valve body during positioning of the means of distribution 40. Pre-installation of the washer 40 on the valve body causes pre-stressing of the valve body before it is positioned in the opening in the wheel rim. As a result, the forces which remain to be applied at the time of positioning the valve in the opening in the wheel rim are reduced and, even if they are applied during fitting of the tire by poorly skilled personnel, they will not cause further damage to the material constituting the sealing groove 21. As a result, this sealing groove remains in a better condition for the entirety of its operation, which increases the service life of an inflation valve according to the invention in comparison with known inflation valves, regardless of whether or not the thickness of the wheel rim is considerable.

It should be noted that the pre-positioning of the means of distribution 40 on the valve body may take place at any point on the truncated intermediate part 22 and on the valve head 20.

Figure 4:
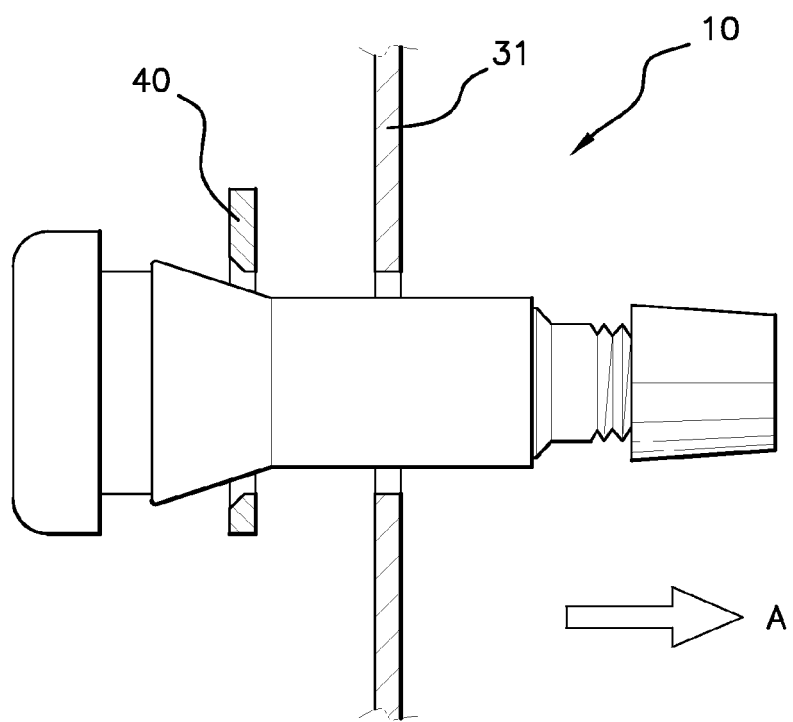
FIG. 4 is a schematic view of an inflation valve according to the present invention at the time of its introduction into an opening in a wheel rim.

As depicted in FIG. 4, the means of distribution is, for example, pre-positioned essentially half-way along the length of the intermediate part 22. The positioning of the valve on the wheel rim 31 takes place traction (arrow A—FIG. 4) of the valve towards the right (in the depicted example). It should be noted that, in FIG. 4, the depicted inflation valve is not associated with an electronic module. In fact, the pre-positioning of the means of distribution may be performed on any type of valve capable of elastic deformation, regardless of whether they are incorporated, or not, in an electronic tire pressure monitoring module.

When this inflation valve is positioned in an opening 30 in a wheel rim 31 (case represented in FIG. 3), this means of distribution 40 is displaced towards the left (FIG. 4) in order to be in the final position (FIG. 3) in which it is arranged in continuous clamping contact with the bottom of the sealing groove 21. The means of distribution 40 is then clamped between one of the branches 21*b* of the sealing groove 21 (that is to say against the valve head 20) and the wheel rim 31.

Figure 6A:
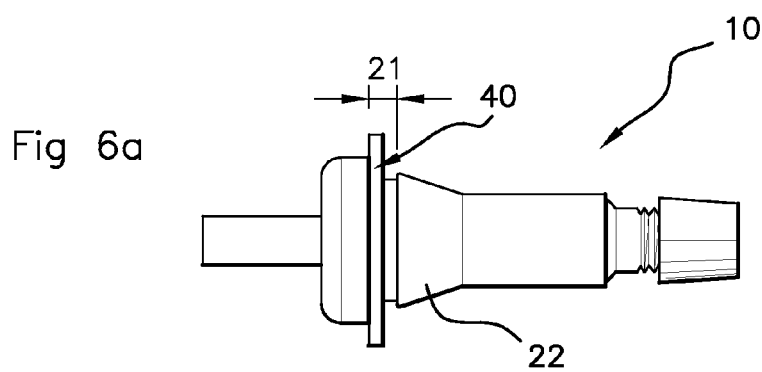
FIGS. 6a to 6c are schematic views depicting different pre-positionings of the means of distribution according to the invention.
Figure 6B:
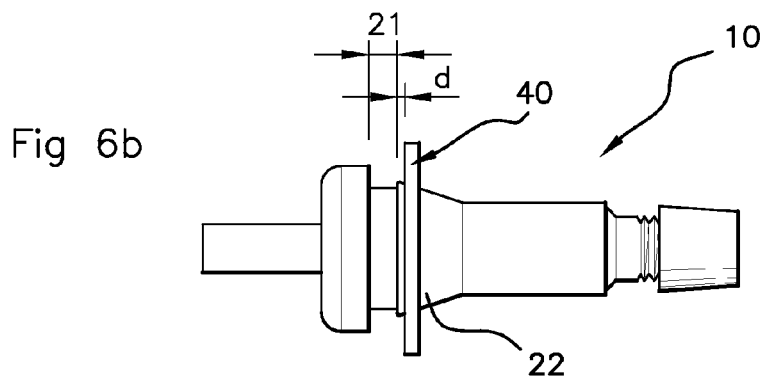
Figure 6C:
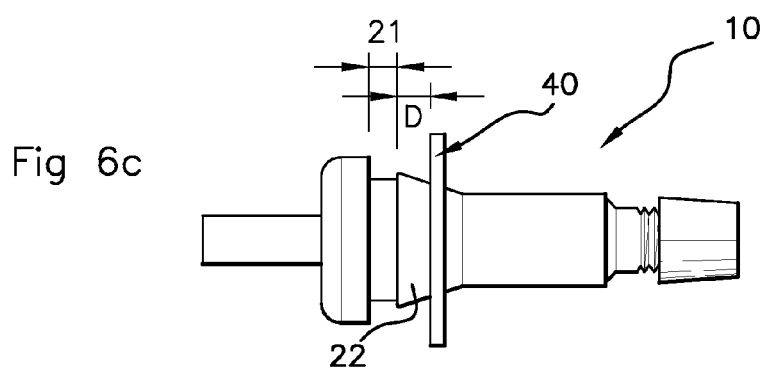

As illustrated in FIGS. 6*a* to 6*c*, the pre-positioning of the means of distribution 40 on the valve body is carried out preferably on the truncated intermediate part 22 of the valve body (FIGS. 6*b* and 6*c*).

The position illustrated in FIG. 6*b* is preferred because the means of distribution 40 is situated on the intermediate part closest to (in the immediate vicinity of) the sealing groove 21. The forces that are necessary in this case for the insertion of the valve into the wheel rim are, in fact, minimal. In FIG. 6*b* the means of distribution is, in fact, positioned at a distance (d) from the sealing groove, and in FIG. 6*c* the means of distribution is positioned at a distance (D) from the sealing groove (with D>d). FIG. 6*a* thus represents less effective pre-positioning for the reduction of the insertion forces.

The force necessary for the insertion of the valve into the opening in the wheel rim is, of course, proportional to the diameter of the truncated part of the valve body.

The position depicted in FIG. 6*a*, (in which the means of distribution 40 is positioned ab initio in the sealing groove 21), is also possible, however.

According to the invention, the addition of a means for the distribution 40 of the shear forces C makes it possible to increase the service life of the inflation valves that are capable of elastic deformation for wheel rims of small thicknesses, but also for wheel rims 31 of which the thickness is greater than or equal to 1.5 mm. The increase in the service life of this valve is attributable in particular to the following factors:

- by distributing the pressure forces F (FIG. 3) of the wheel rim 31 and the centrifugal forces exerted during rotation of the wheel rim (when the vehicle is in motion) on a larger surface (with the help of the washer 40) at the bottom of the sealing groove 21, the shear forces C and the concentrations of stresses exerted by the wheel rim 31 are reduced at the bottom of the wheel rim. The "knife" effect is avoided in this way.
- by pre-positioning the means of distribution 40 (provided with appropriate chamfers) on the valve body 12, the necessary forces at the moment of insertion of the inflation valve into the opening in the wheel rim are reduced.

The invention relates to an inflation valve as described above, whether or not it is associated with an electronic module.

The invention also relates to an inflation valve that is capable of elastic deformation as described above associated with an electronic module for monitoring the pressure of the tires.

Figure 7A:
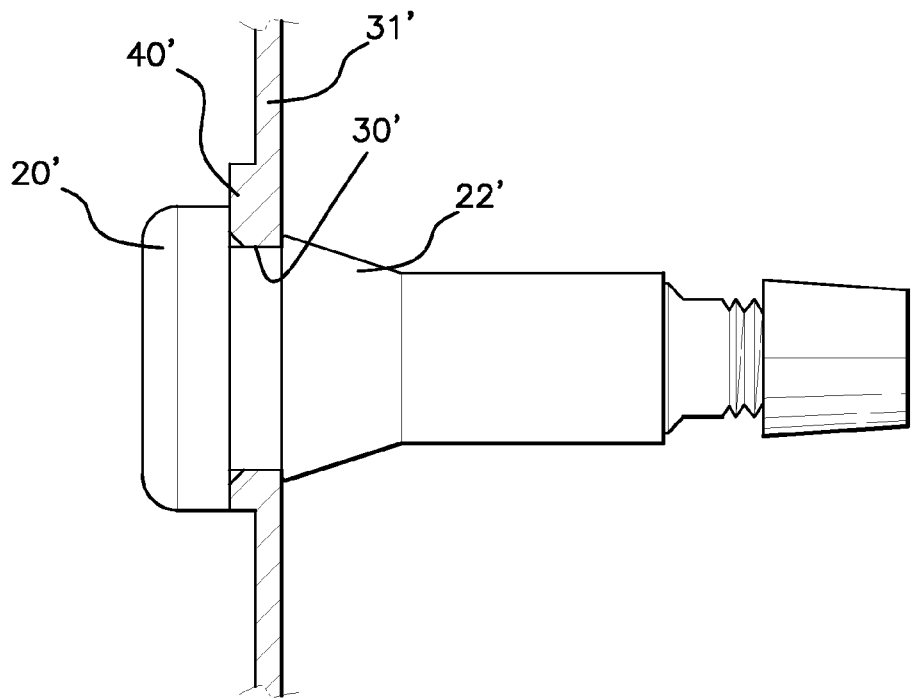
FIGS. 7a and 7b are schematic views depicting a wheel rim according to the invention provided with an integrated means of distribution.
Figure 7B:
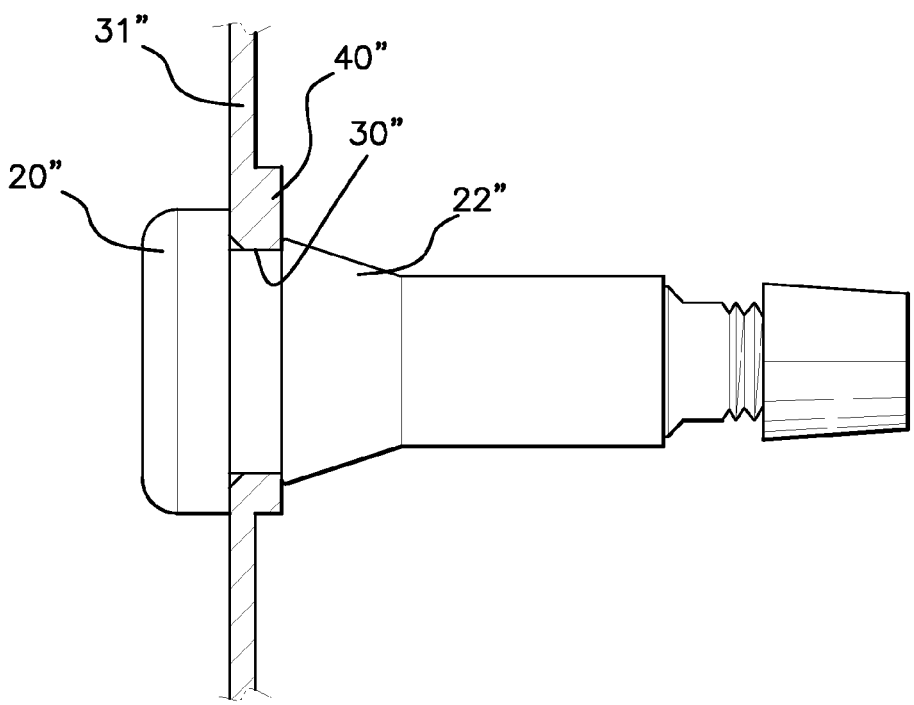

According to the embodiment depicted in FIGS. 7a and 7b, the wheel rims 31', 31" are provided at the level of their openings 30', 30" with an excess thickness 40', 40" forming a means for the distribution of the shear forces. This excess thickness may be provided on the side of the valve head 20' or, conversely, on the side of the intermediate part 22". In the cases depicted in FIGS. 7a and 7b, the means for the distribution of the forces 40', 40" makes it possible to increase the service life of inflation valves of the "snap-in" type significantly when they are used with wheel rims of small thicknesses. The local enlargement of the thickness of the wheel rim at the level of the opening in the wheel rim in fact makes it possible to reduce the "knife" effect of wheel rims of small thicknesses. It is to note that the excess thickness 40' or 40" may be achieved by the incorporation of a washer in the peripheral zone surrounding the opening 30' or 30" in the wheel rim.

The invention also relates to a method of installation of an inflation valve on a wheel rim of a motor vehicle. This method includes the following stages:

- pre-positioning of a means 40 for the distribution of the shear forces between the inflation valve and the wheel rim,
- insertion of the inflation valve into the opening in the wheel rim, and
- insertion of the means of distribution into the sealing groove between the wheel rim and the valve head.

The valve is preferably pre-installed on the intermediate part in the vicinity of the sealing groove of the valve body ahead of its insertion into the wheel rim opening.

It should be noted that the invention may be implemented according to three different embodiments:

- According to a first embodiment, the washer is positioned between the wheel rim and the valve without pre-installation either on the valve or on the wheel rim.
- According to a second embodiment, the means of distribution is an integral part of the wheel rim and is constituted by an excess thickness realized in the immediate vicinity of the opening in the wheel rim intended to receive the inflation valve. This excess thickness may be constituted, for example, by the incorporation of a washer around the opening in the wheel rim.
- According to a third embodiment, the means of distribution is associated with the inflation valve. In a preferential manner, it is pre-installed on this inflation valve.

The present invention is not restricted to the embodiments described above. The means of distribution 40 according to the invention may thus be provided with a cup or with a tab (not depicted) partially covering the valve head 20 in order to protect it.

As a variant, the thickness of the washer may be variable and may be adjusted manually at the moment of installation, depending on the thickness of the wheel rim. For example, washers having a variable thickness (peelable, for example) can be utilized for this purpose.

The invention claimed is:

1. Wheel rim of a motor vehicle equipped with a inflation valve (10) of a type that is capable of elastic deformation adapted to be positioned in an opening (30) in the wheel rim, said inflation valve (10) exhibiting:
   - a valve body (12) made from an elastically deformable material surrounding a valve core (11) adapted to form an air passageway (15), the valve body (12) being provided with a sealing groove (21) adapted to receive the wheel rim,
   - an external extremity (13) provided with a sealing cap (18) for closing the air passageway (15) in a detachable manner,
   - an internal extremity (14) forming a valve head (20) having a diameter greater than the opening in the wheel rim,
   - an intermediate part (22) having a diameter greater than the opening in the wheel rim and smaller than the valve head (20) situated between the external extremity (13) of the inflation valve and the sealing groove (21), the said wheel rim being characterized in that a means for the distribution (40) of shear forces is arranged between the wheel rim (31) and the valve (12).

2. Wheel rim according to claim 1, characterized in that the means of distribution (40', 40") is an integral part of the wheel rim and is constituted by an excess thickness realized in the immediate vicinity of the opening (30, 30', 30") of the wheel rim intended to receive the inflation valve.

3. Inflation valve (10) intended to be positioned in an opening (30, 30', 30") in the wheel rim (31, 31', 31") of a motor vehicle, the said inflation valve being of the type that is capable of elastic deformation, and exhibiting:
   - a valve body (12) made from an elastically deformable material surrounding a valve core (11) adapted to form an air passageway (15), the valve body (12) being provided with a sealing groove (21) adapted to receive the wheel rim,
   - an external extremity (13) provided with a sealing cap (18) for closing the air passageway (15) in a detachable manner,
   - an internal extremity (14) forming a valve head (20) having a diameter greater than that of the opening in the wheel rim,
   - an intermediate part (22) having a diameter greater than the opening in the wheel rim and smaller than the valve head (20) situated between the external extremity (13) of the inflation valve and the sealing groove (21), the said inflation valve being characterized in that it is provided with a means for the distribution (40) of shear forces arranged on the valve body.

4. Inflation valve according to claim 3, characterized in that the means of distribution (40) is a washer produced from a material having a hardness greater than that of the elastically deformable material of the valve body (12).

5. Inflation valve according to claim 4, characterized in that the means of distribution (40) is pre-installed on the intermediate part (22) of the valve by elastic clamping.

6. Inflation valve according to claim 5, characterized in that the means of distribution (40) is arranged in the immediate vicinity of the sealing groove (21).

7. Inflation valve according to claim 3 characterized in that it is associated with an electronic module.

8. Method of installation of an inflation valve according to claim 5 on a wheel rim of a motor vehicle, the said method including the following stages:
   pre-positioning of a means for the distribution (40), 40', 40") of the shear forces between the inflation valve (10) and the wheel rim (31, 31', 31"),
   insertion of the inflation valve into an opening (30) in the wheel rim, and
   insertion of the means of distribution into the sealing groove (21) between the wheel rim and the valve head.

9. Method of installation according to claim 8, characterized in that the valve (10) is pre-installed on the intermediate part (22) of the valve body ahead of its insertion into the opening in the wheel rim.

10. Method of installation according to claim 9, characterized in that the means of distribution is pre-installed in the vicinity of the sealing groove.

\* \* \* \* \*